United States Patent [19]

Sparrow

[11] 4,026,562
[45] May 31, 1977

[54] SEALS

[75] Inventor: Alan Wycliffe Sparrow, Peterborough, England

[73] Assignee: Perkins Engines Limited, London, England

[22] Filed: May 27, 1975

[21] Appl. No.: 580,647

[30] Foreign Application Priority Data

June 5, 1974 United Kingdom .............. 34859/74

[52] U.S. Cl. .................................. 277/1; 277/165; 277/169; 92/86
[51] Int. Cl.² ......................................... F16J 15/56
[58] Field of Search ............ 92/81, 86, 85 R, 85 B; 277/168, 165, 169

[56] References Cited

UNITED STATES PATENTS 2,879,986  3/1959  Maier ................. 92/85 R

FOREIGN PATENTS OR APPLICATIONS 1,142,034  2/1969  United Kingdom ............... 277/168

Primary Examiner—Robert I. Smith
Attorney, Agent, or Firm—Thomas P. Lewandowski

[57] ABSTRACT

A seal for reciprocating members such as a shaft having a seal ring of deformable material on which an annular taper is maintained to provide pumping action for return of fluid to replenish fluid lost past the seal.

8 Claims, 1 Drawing Figure

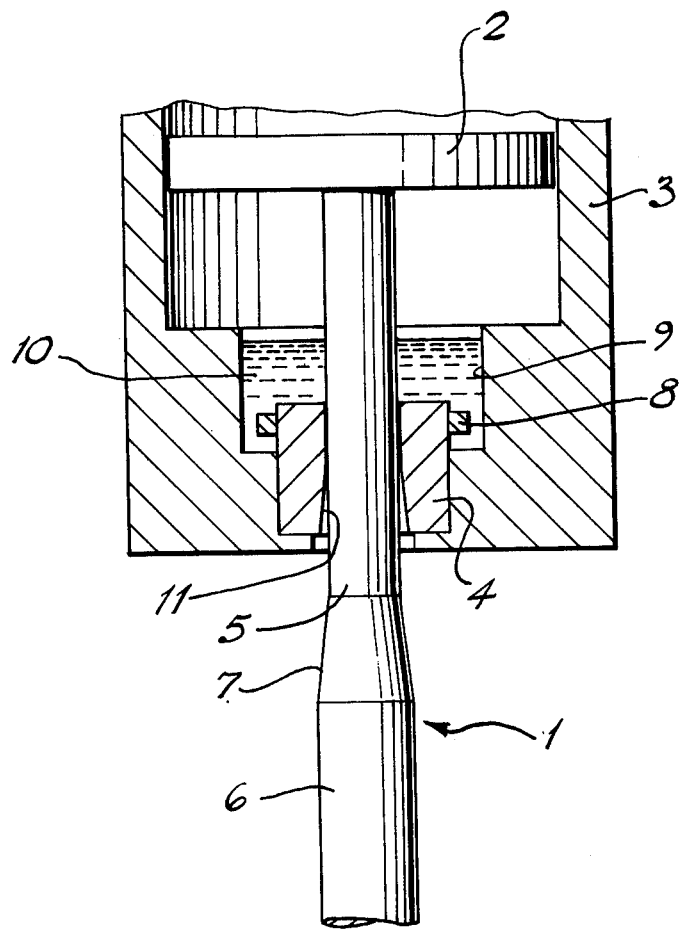

SEALS

This invention relates to sealing devices and in particular but not exclusively to devices for sealing around a reciprocating shaft.

It is known to provide a sealing device comprising a gland and a shaft in which a taper between the shaft and the gland causes oil to be hydrodynamically pumped past the gland from a low pressure area to a higher pressure area. Oil flow in the opposite direction is limited by the close tolerance between the shaft and the gland. However, the reciprocating motion of the shaft causes the taper to be worn away and since the taper must be very small to achieve satisfactory pumping the seal ceases to operate satisfactorily.

It has also been proposed to provide a separate high pressure oil pump with a cylindrical gland but such an arrangement is expensive.

It is an object of the present invention to obviate or mitigate the above disadvantages.

According to the present invention there is provided a sealing device comprising a gland of plastically deformable material, a shaft adapted to reciprocate relative to said gland, and means on said shaft for deforming the gland so as to generate a tapered annulus between said shaft and said gland.

Preferably said means is a taper on said shaft which is adapted to abut and deform said gland at one end of the reciprocating travel.

Preferably also said material is glass reinforced polytetrafluorethylene.

As a further preference at least one part of said gland is resiliently biased against said shaft to provide a close fit therebetween.

According also to the present invention there is provided a machine comprising a cylinder having end walls closing said cylinder, a piston adapted to reciprocate within said cylinder, a piston rod connected to said piston for movement therewith and passing through at least one end wall of said cylinder, a sealing device comprising a gland of plastically deformable material fixed to said end wall and said piston rod passing therethrough, said piston rod having means for generating a tapered annulus between said rod and said gland whereby leakage past said gland is returned therethrough by hydraulic pressure generated by movement of said piston rod past said gland.

Preferably said means is a taper formed on said rod and adapted to abut said gland at one extreme of the reciprocating travel.

According also to the present invention a method of providing a seal between two zones of different pressures consists of the provision of a gland of plastically deformable material and a shaft adapted to reciprocate relative to said gland, and comprises the steps of firstly arranging said gland to encompass said shaft, secondly arranging for a tapered member to be carried by said shaft and thirdly allowing said taper to abut said gland at one extreme of the reciprocating travel thereby to generate a tapered annulus between said gland and said shaft during the remainder of said travel.

An embodiment of the invention will now be described by way of example only with reference to accompanying drawings in which:

FIG. 1 is a sectional elevation of a sealing device.

A shaft in the form of a piston rod 1 is connected to a piston 2 slidably mounted within a cylinder 3. The piston rod 1 passes through an annular gland 4 which is housed and retained for instance by high pressure, in the cylinder 3 and provides a seal between a recess 9 and the outside of cylinder 3. The piston rod 1 is formed with two concentric portions 5, 6, of differing diameters interconnected by a taper 7. The gland 4, which is made of plastically deformable material, such as glass reinforced polytetrafluoroethylene (PTFE), is biased against the piston rod 1 by a circular spring 8. The recess 9 is provided in the cylinder 3 adjacent the piston rod 1 to accommodate a fluid 10, which is preferably oil.

In operation, the piston 2 is caused to reciprocate in the cylinder 3 by pressure differentials acting across it. As the piston 2 moves towards the recess 9, oil flow from the recess past the gland 4 is limited by the close fit induced by the force of the spring 8. However, a small amount of oil is carried past the gland 4 by the piston rod 1 and it is therefore necessary to replace the lost oil. When the piston 2 reaches the outer end of its stroke, its direction of motion is reversed and the piston rod 1 moves upwards past the gland 4 as seen in the Figure. As the piston 2 reaches the end of its stroke, the taper 7 abuts the gland 4 and generates a tapered annulus 11 between the rod 1 and gland 4. On subsequent upward strokes of the piston away from the recess 9, the tapered annulus causes oil on the piston rod 1 to be hydrodynamically pumped into the recess 9, thus replenishing the fluid. The tapered annulus 11 is regenerated by the taper 7 at the end of each upward stroke of the piston 2 and thus compensates for any loss of shape due to wear between the gland 4 and the rod 1. The included angle of the taper 7 must be very small, in the order of $0.15°$ to achieve satisfactory pumping action and so any loss of the taper by wear between the rod and the gland is detrimental to the operation of the device. The invention therefore provides a sealing device in which the tapered annulus and hence the efficiency of the device is maintained.

The sealing device is particularly applicable to stirling engines in which it is necessary to maintain very high pressures in the working cylinder. Failure of the seal between the cylinder and the piston rod leads to total failure of the engine and so the efficiency of the seal must be maintained at all times.

The taper may be formed on the shaft by other means, such as for example, by controlled plating on a parallel shaft or by a tapered bush carried by the shaft.

What we claim is:

1. A sealing device comprising: a ring of plastically deformable material, a reciprocating member within said ring, means for retaining said ring stationary to permit movement of said reciprocating member relative thereto, a tapered annulus generatable upon one end of said ring and means for deforming said ring to generate a tapered annulus between said reciprocating member and said ring, said tapered annulus causing pumping of fluid in the direction of movement toward the tapered end of said ring.

2. A sealing device according to claim 1 wherein said means on said reciprocating member for deforming said ring includes a taper on the reciprocating member which is adapted to abut and deform said ring at one end of the reciprocating travel.

3. A sealing device according to claim 1 wherein said deformable material is glass reinforced polytetrafluorethylene.

4. A sealing device according to claim 1 wherein said means for retaining said ring includes means resiliently biasing said ring against said reciprocating member to provide a close fit therebetween.

5. A sealing device according to claim 1 wherein said taper on said reciprocating member is of the order of 0.15° to the reciprocating member axis of said reciprocating member.

6. A machine comprising a cylinder having end walls closing said cylinder, a piston adapted to reciprocate within said cylinder, a piston rod connected to said piston for movement therewith and passing through at least one end wall of said cylinder, a sealing device including a ring of plastically deformable material fixed to said end wall and said piston rod passing therethrough, means for generating a tapered annulus between said rod and said ring on said piston rod whereby leakage past said ring is returned therethrough by hydraulic pressure generated by movement of said piston rod past said ring.

7. A machine as claimed in claim 6 constituted by a stirling engine.

8. A method of providing a seal between two zones of different pressures consists of the provision of a gland of plastically deformable material and a shaft adapted to reciprocate relative to said gland, and comprises the steps of firstly arranging said gland to encompass said shaft, secondly arranging for a tapered member to be carried by said shaft and thirdly allowing said taper to abut said gland at one extreme of the reciprocating travel thereby to generate a tapered annulus between said gland and said shaft during the remainder of said travel.

* * * * *